US00RE39250E

(19) United States
(12) Reissued Patent
Freeman et al.

(10) Patent Number: US RE39,250 E
(45) Date of Reissued Patent: Aug. 29, 2006

(54) ELECTRODE PACKAGE

(75) Inventors: Gary A. Freeman, Newton Center, MA (US); Ward M. Hamilton, Amherst, NH (US)

(73) Assignee: ZOLL Medical Corporation, Burlington, MA (US)

(21) Appl. No.: 08/962,271

(22) Filed: Oct. 31, 1997

Related U.S. Patent Documents

Reissue of:
(64) Patent No.: 5,462,157
Issued: Oct. 31, 1995
Appl. No.: 08/144,665
Filed: Oct. 28, 1993

(51) Int. Cl.
*B65D 81/24* (2006.01)

(52) U.S. Cl. ..... 206/210; 206/204; 206/438; 206/701; 128/640

(58) Field of Classification Search ..... 206/205, 206/210, 438, 460, 461, 570; 600/391–397; 607/152, 153
See application file for complete search history.

(56) References Cited

U.S. PATENT DOCUMENTS

| | | | | | |
|---|---|---|---|---|---|
| 2,590,876 | A | * | 4/1952 | Landauer | 607/152 |
| 2,699,779 | A | * | 1/1955 | Lustig | 128/268 |
| 3,086,652 | A | | 4/1963 | Lipscomb | 206/328 |
| 3,198,329 | A | | 8/1965 | Golenpaul et al. | 206/65 |
| 3,265,945 | A | | 8/1966 | Jennings et al. | 206/328 |
| 3,585,275 | A | | 6/1971 | Gillemot | 206/328 |
| 3,602,216 | A | | 8/1971 | Moe, Jr. | 128/2.06 |
| 3,685,645 | A | * | 8/1972 | Kawaguchi | 206/63.2 R |
| 3,698,549 | A | * | 10/1972 | Glassman | 383/211 |
| 3,701,346 | A | | 10/1972 | Patrick, Jr. et al. | 206/328 |
| 3,830,229 | A | | 8/1974 | Johnson | 206/328 |
| 3,961,623 | A | | 6/1976 | Milani et al. | 128/2.06 |
| 4,029,086 | A | | 6/1977 | Corasanti | 128/2.06 E |
| 4,034,854 | A | | 7/1977 | Beuilacqua | 206/210 |
| 4,061,408 | A | * | 12/1977 | Bast et al. | 339/75 R |
| 4,082,086 | A | * | 4/1978 | Page et al. | 128/640 |
| 4,116,338 | A | * | 9/1978 | Weichselbaum | 206/610 |
| 4,168,000 | A | * | 9/1979 | MacRitchie | 206/63.3 |
| 4,176,746 | A | * | 12/1979 | Kooi | 206/438 |
| 4,362,165 | A | * | 12/1982 | Carmon et al. | 607/153 |
| 4,365,634 | A | * | 12/1982 | Bare et al. | 607/153 |
| 4,423,732 | A | * | 1/1984 | Tarjan et al. | 206/438 |
| 4,439,810 | A | | 3/1984 | Shimada et al. | 206/328 |
| 4,487,313 | A | | 12/1984 | Repik et al. | 206/328 |
| 4,522,211 | A | * | 6/1985 | Bare et al. | 128/640 |
| 4,539,996 | A | * | 9/1985 | Engel | 600/392 |
| 4,653,501 | A | * | 3/1987 | Cartmell et al. | 128/640 |
| 4,715,382 | A | * | 12/1987 | Strand | 600/397 |
| 4,731,926 | A | * | 3/1988 | Sibalis | 600/392 |
| 4,779,630 | A | | 10/1988 | Scharnberg et al. | 128/783 |
| 4,798,208 | A | * | 1/1989 | Faasse, Jr. | 128/640 |
| 4,978,007 | A | * | 12/1990 | Jacobs et al. | 206/460 |
| 5,133,355 | A | * | 7/1992 | Strand et al. | 600/392 |
| 5,150,708 | A | * | 9/1992 | Brooks | 600/391 |
| 5,191,887 | A | * | 3/1993 | Cartmell | 128/640 |
| 5,203,330 | A | * | 4/1993 | Schaefer et al. | 128/640 |
| 5,402,884 | A | | 4/1995 | Gilman et al. | 206/328 |
| 5,579,919 | A | | 12/1996 | Gilman et al. | 206/701 |

FOREIGN PATENT DOCUMENTS

| | | | |
|---|---|---|---|
| FR | 2483215 | 12/1981 | 206/210 |

* cited by examiner

*Primary Examiner*—Jila M. Mohandesi
(74) *Attorney, Agent, or Firm*—Fish & Richardson P.C.

(57) ABSTRACT

An electrode package in which one or more adhesively-applied skin electrodes may be sealed has an envelope that includes a sheet of material and a releasable seal joining portions of the envelope to provide a sealed first compartment in which an electrode may be isolated from an external environment. The envelope includes a first wall that defines a first interior surface facing the interior of the sealed first compartment. The first interior surface includes an electrode mounting surface for direct attachment of an adhesive portion of an electrode. The envelope is releasably sealed so that, when the envelope is sealed, the first interior surface is isolated from an external environment and, when the envelope is unsealed, the first interior surface is not isolated from the external environment.

43 Claims, 6 Drawing Sheets

ELECTRODE PACKAGE

Matter enclosed in heavy brackets [ ] appears in the original patent but forms no part of this reissue specification; matter printed in italics indicates the additions made by reissue.

BACKGROUND OF THE INVENTION

The invention relates to electrode packages.

Skin-applied electrodes used in medical applications such as cardiac pacing or defibrillation are well known. Typically, these electrodes consist of a wire lead that is attached at one end to a connector for a medical device and, at the other end, to a conductor such as a thin layer of tin or another metal resting on a foam backing. The conductor is covered with a water-based, conductive adhesive gel that contacts a patient's skin and electrically connects the electrode to the patient.

To prevent the adhesive gel from drying out, and to maintain the electrodes in a sanitary condition, the electrodes are stored in a package prior to use. In some such packages, plastic covers are positioned over the conductive adhesive gel of each electrode. The covered electrodes are then positioned within a sealed bag. To use the electrodes, medical personnel must tear open the bag, pull out and separate the electrodes, connect the electrodes to an appropriate medical device such as a defibrillator, remove the plastic covers, and apply the electrodes to the patient.

SUMMARY OF THE INVENTION

In one aspect, generally, the invention features an electrode package in which the conductive adhesive gel of an electrode is attached directly to an electrode mounting surface located on an interior surface of a wall of a releasably sealed envelope. When sealed, the envelope isolates the electrode from the external environment and thereby prevents the adhesive gel from drying out. To use the electrode, medical personnel tear open the envelope and expose the electrode.

Because the electrode is attached directly to the interior surface of the envelope, the steps of pulling the electrode out of the bag and removing the plastic cover that were required when using prior electrode packages are condensed into a single step of detaching the electrode from the interior surface of the package. The time saved by the elimination of a step can literally be the difference between life and death in an emergency situation. For example, when defibrillation is required, every second of delay in applying the electrode can be critical. Moreover, attaching the electrode to the interior of the envelope eliminates the risk of dropping the electrode that occurs when the electrode is loosely packaged within a bag or other container.

Typically, a second electrode is directly attached to an electrode mounting surface of a second interior surface of the envelope so that, when the envelope is sealed, the first and second interior surfaces face each other. The envelope is then unsealed in a manner similar to that of opening a book so that the two electrodes, like the facing pages of a book, are located on a single surface. This arrangement, which makes both electrodes readily accessible by medical personnel, further simplifies and accelerates the process of applying the electrodes to the patient. In addition, it provides a compact, efficient package.

For ease of assembly and use, the envelope is formed from a single sheet of material that is folded to form a first edge of the envelope and releasably heat sealed to form the remaining edges. This construction ensures that, when the envelope is opened, the electrode is fully exposed and readily available to medical personnel.

To further ease opening of the package, a pair of tabs are located opposite the folded edge of the envelope. To open the envelope, medical personnel need only grasp these tabs and pull them apart. This releases the heat seal and exposes the electrode.

The envelope also includes a reinforcing layer located at the electrode mounting surface. The reinforcing layer provides structural rigidity and protects the electrode.

Finally, to temporarily secure a wire lead of the electrode during assembly and to prevent the wire lead from becoming tangled, the envelope includes an adhesive strip located on its interior surface.

In another aspect, generally, the invention features an electrode package that has a first compartment in which an electrode is sealed, a second compartment in which a connector of the electrode is sealed, and a barrier element between the compartments that provides an electrically conductive path between the electrode and the connector. The barrier element allows the second compartment to be opened, and the connector exposed, without affecting the seal of the first compartment or exposing the electrode.

Because the connector can be exposed without exposing the electrode, the electrode can be preconnected to a medical device without the risk of contaminating the electrode or drying out its conductive adhesive layer. Thus, the electrode can be connected to the medical device before an emergency arises, and the step of connecting the electrode to the device, and its associated delay, can be eliminated from the electrode application procedure in an emergency situation such as when defibrillation is required.

The barrier element can also be employed in an electrode package having only a single compartment to similarly allow preconnection of the electrode to a medical device.

One method of implementing the barrier element includes forming a layer of material around a wire lead that is attached between the connector and the electrode. The layer is formed so that it includes an arcuate upper portion and an arcuate lower portion. To form the barrier element and seal the compartment, a first wall of the compartment is heat sealed to the arcuate upper portion, a second wall of the compartment is heat sealed to the arcuate lower portion, and the first and second walls are heat sealed to each other.

Another method of implementing the barrier element involves using the connector body as a portion of the barrier element. Typically, the body is formed from a single piece of material and includes an integral hinge. The body also includes strain relief posts that arranged so as to relieve strain on a wire lead located between the electrode and the connector. To ease formation of the barrier element and sealing of the compartment, the body includes a first end located in the compartment, a second end located outside of the compartment, and a central section that is used as part of the barrier element. The central section includes an arcuate upper portion and an arcuate lower portion and the barrier element is formed by heat sealing a first wall of the compartment to the arcuate upper portion, heat sealing a second wall of the compartment to the arcuate lower portion, and heat sealing the first and second walls to each other.

When the features of attaching electrodes to interior surfaces of the envelope and using an envelope having two compartments are combined, the process of applying the electrode to a patient is greatly simplified. Medical personnel no longer have to tear open a bag, pull out the electrodes, separate them, connect them to an appropriate medical device, remove plastic covers from them, and apply them to the patient. Instead, because the electrodes are preconnected to the medical device, the medical personnel need only tear open the package, detach the electrodes from the package, and attach them to the patient.

Other features and advantages of the invention will be apparent from the following description of the preferred embodiments and from the claims.

DESCRIPTION OF THE PREFERRED EMBODIMENTS

Figure 1:
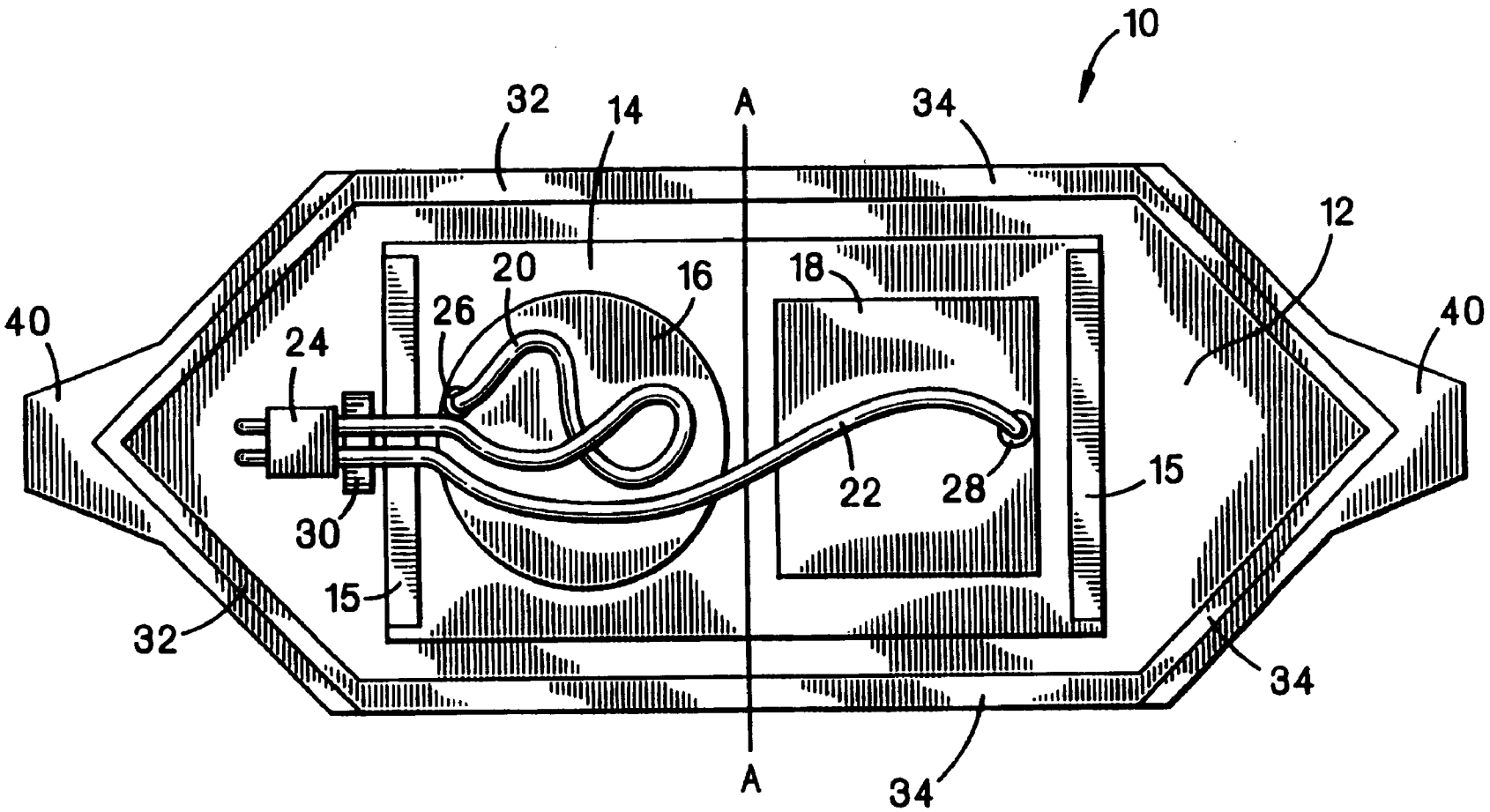
FIG. 1 is a top view of an electrode package in an unsealed configuration.

Referring to FIG. 1, an electrode package 10 (shown in an unsealed configuration) includes an outer sheet 12 on which is mounted a liner 14 that provides structural rigidity. Outer sheet 12 is made of a polyester, aluminum, TYVEK laminate. Liner 14 is made from styrene and is approximately two millimeters thick. Liner 14 is secured to outer sheet 12 by a pair of adhesive strips 15 that are implemented using double-sided adhesive tape attached between outer sheet 12 and liner 14.

In use, electrodes 16, 18 are attached to liner 14. Wire leads 20, 22, which are attached at one end to a connector 24, and at the other end, respectively, to terminals 26, 28 on electrodes 16, 18, are temporarily secured by an adhesive strip 30. Adhesive strip 30 is implemented using double-sided adhesive tape.

Figure 2:
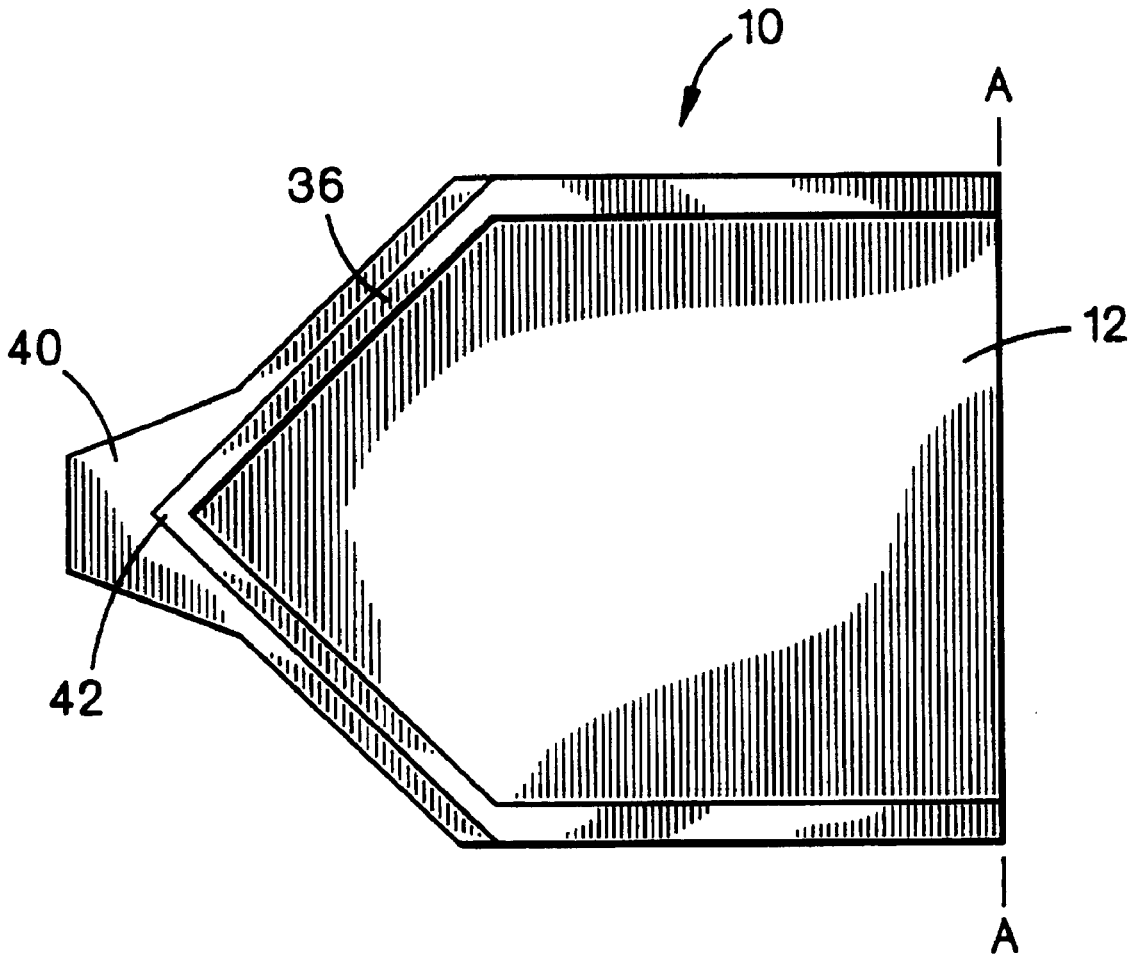
FIG. 2 is a top view of the electrode package of FIG. 1 in a sealed configuration.

Referring also to FIG. 2, which shows electrode package 10 in a sealed configuration, electrode package 10 is sealed by folding sheet 12 along an axis A so that electrodes 16, 18 face each other. In this configuration, regions 32 contact regions 34. Thereafter, regions 32, 34 are heated to form heat seals 36.

Tabs 40, which are not sealed together, are used in opening electrode package 10. Tabs 40, focus, in a region 42 of heat seals 36, a force applied to tabs 40 by, for example, an emergency medical technician pulling tabs 40 away from each other. By focusing the force, tabs 40 minimize the force needed to break heat seals 36. Once seals 36 are broken at region 42, additional force on tabs 40 splits the remainder of heat seals 36 until electrode package 10 folds entirely open to expose electrodes 16, 18 as shown in FIG. 1.

Figure 3:
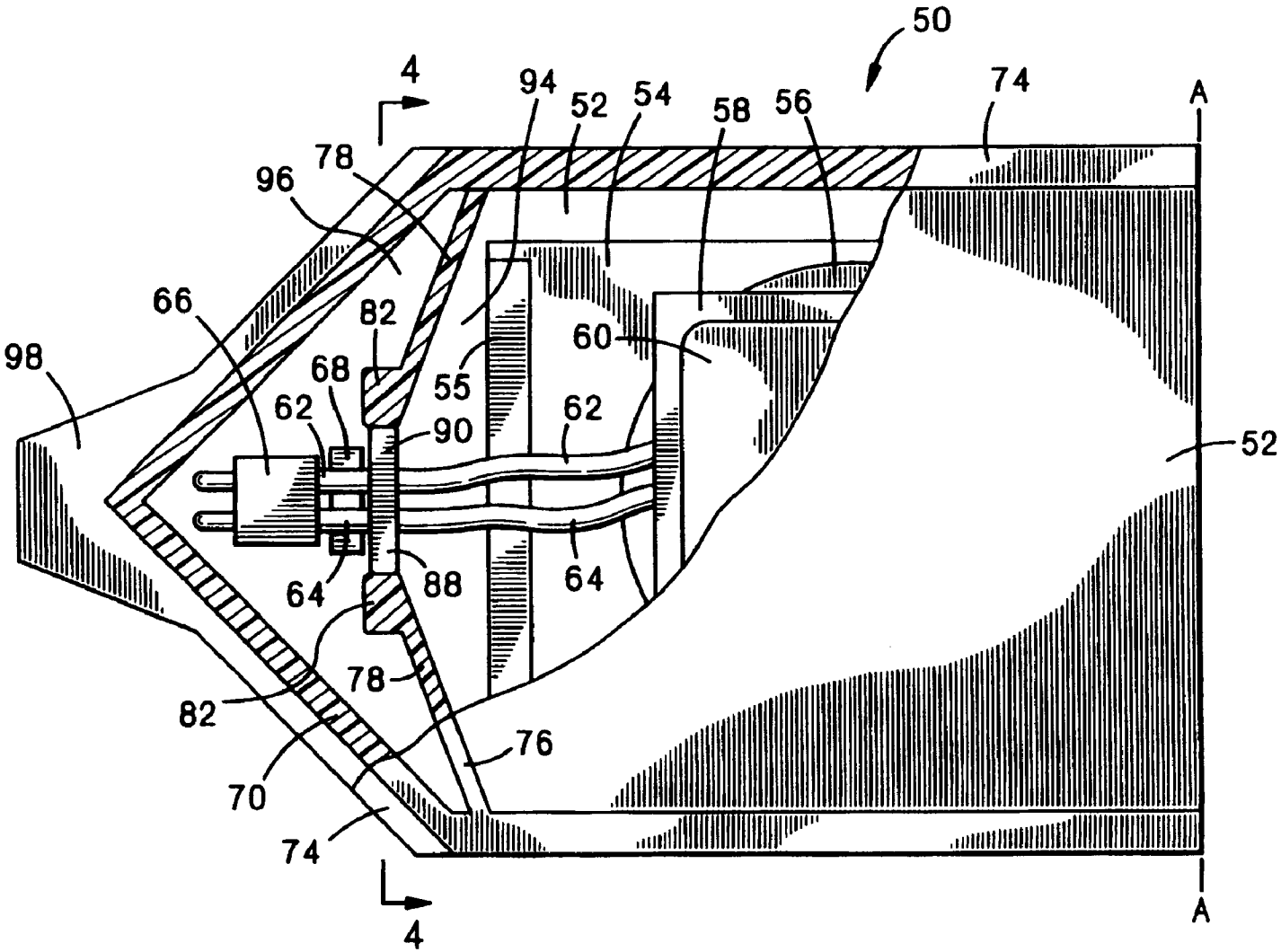
FIG. 3 is a cutaway top view of a dual-compartment electrode package in a sealed configuration.

Referring to FIG. 3, a dual-compartment electrode package 50 includes an outer sheet 52 on which is mounted a liner 54. As with electrode package 10, electrodes 56, 58 are attached to liner 54 and, when, as shown, dual-compartment electrode package 50 is sealed, face each other. Line 54 is attached to outer sheet 52 by a pair of adhesive strips 55. As shown in the cutaway portion, electrode 58 attaches to liner 54 via a layer of adhesive gel 60 on electrode 58.

Wire leads 62, 64, which are attached at one end to a connector 66, and at the other end, respectively, to electrodes 56, 58, are temporarily secured by an adhesive strip 68.

Figure 4:
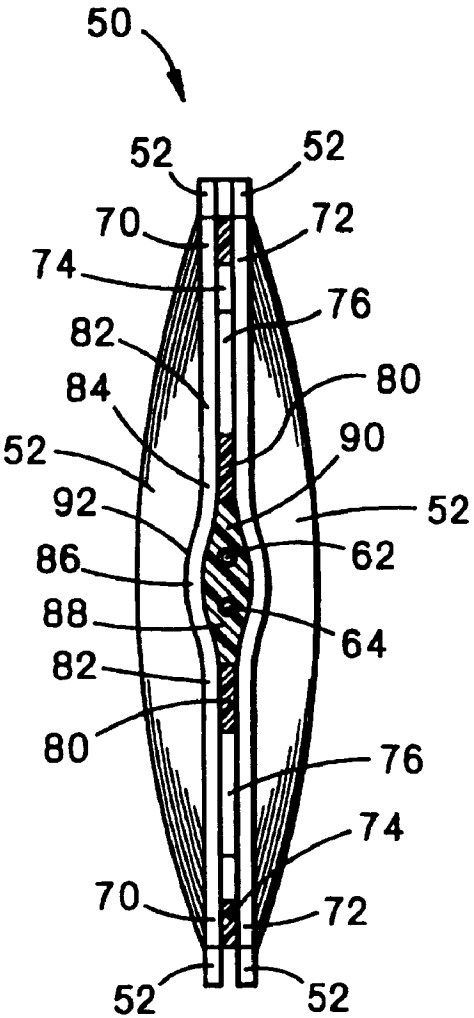
FIG. 4 is a cross-sectional view of the dual-compartment electrode package of FIG. 3.

Referring also to FIG. 4, sheet 52 is folded along an axis A so that regions 70 contact corresponding regions 72 from the opposite end of sheet 52 and are heated to form heat seals 74. In addition, heat seals 76 are formed from regions 78 and corresponding regions from the opposite end of sheet 52; heat seals 80 are formed between regions 82 and corresponding regions from the opposite end of sheet 52; and heat seals 84 are formed between a gasket 88 and regions 86 of sheet 52.

Gasket 88 is produced by forming a layer of RTV or a so-called "hot-melt" adhesive around wire leads 62, 64. Gasket 88 has an arcuate upper surface 90 and an arcuate lower surface 92.

Gasket 88, in combination with heat seals 76, 80 and 84, forms a barrier element between a first compartment 94 and a second compartment 96 of dual-compartment electrode package 50. The barrier element allows second compartment 96 to be opened without opening first compartment 94.

As shown in FIG. 4, gasket 88 simultaneously maintains a seal between compartments 94, 96 and allows wire leads 62, 64 to pass between compartments 94, 96. Thus, gasket 88 provides an electrically conductive path between connector 66 and electrodes 56, 58 even when electrodes 56, 58 are sealed in compartment 94.

As with electrode package 10, dual-compartment electrode package 50 includes a pair of tabs 98 that are used in opening dual-compartment electrode package 50.

Figure 5:
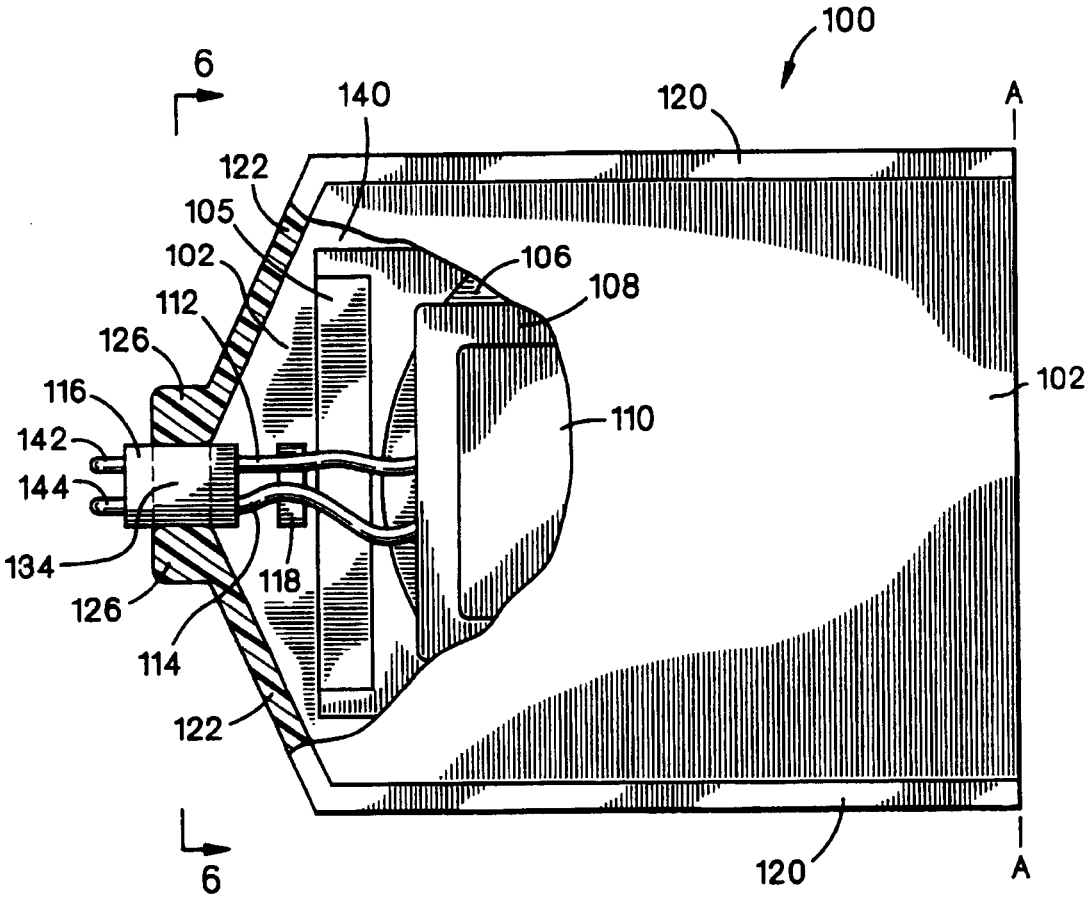
FIG. 5 is a cutaway top view of an electrode package in a sealed configuration.

Referring to FIG. 5, an electrode package 100 includes an outer sheet 102 on which is mounted a liner 104. Electrodes 106, 108 are attached to liner 104 and, when, as shown, electrode package 100 is sealed, face each other. Liner 104 is attached to outer sheet 102 by a pair of adhesive strips 105. As shown in the cutaway portion, electrode 108 attaches to liner 104 via a layer of adhesive gel 110 on electrode 108.

Wire leads 112, 114, which are attached at one end to a connector 116, and at the other end, respectively, to electrodes 106, 108, are temporarily secured by an adhesive strip 118.

Figure 6:
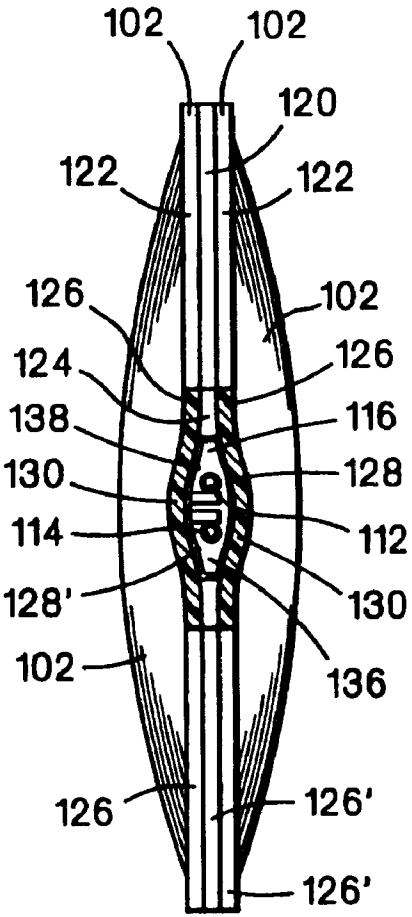
FIG. 6 is a cross-sectional view of the electrode package of FIG. 5.

Referring also to FIG. 6, sheet 102 is folded along an axis A and heated to form heat seals 120 between regions 122 from opposite ends of sheet 102, heat seals 124 between regions 126 from opposite ends of sheet 102, and heat seals 128 between connector 116 and regions 130 of sheet 102.

Figure 13:
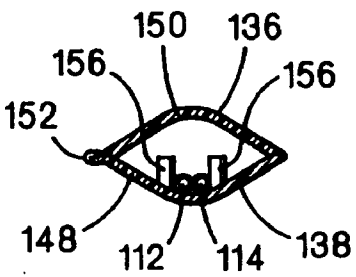
FIG. 13 is a cross sectional view of the electrode connector of FIG. 11.

Referring also to FIG. 13, in a central region 134 between heat seals 128, connector 116 has an arcuate upper surface 136 and an arcuate lower surface 138. Connector 116, in combination with heat seals 124 and 128, forms a barrier element between a compartment 140 of electrode package 100 and the external environment. Connector 116 provides a seal for compartment 140 and an electrically conductive path between electrodes 106, 108 and terminals 142, 144, which are connected, respectively, to wire leads 112, 114.

Figure 8:
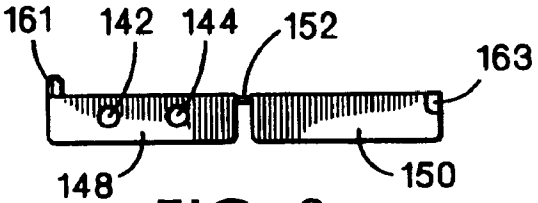
FIG. 8 is a left side view of the electrode connector of FIG. 7.
Figure 9:
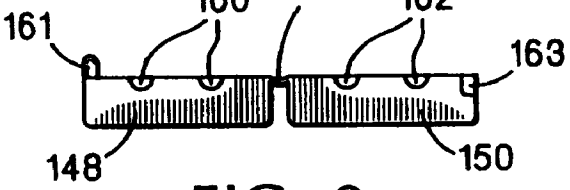
FIG. 9 is a right side view of the electrode connector of FIG. 7.
Figure 12:
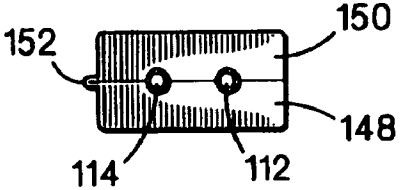
FIG. 12 is a right side view of the electrode connector of FIG. 11.
Figure 7:
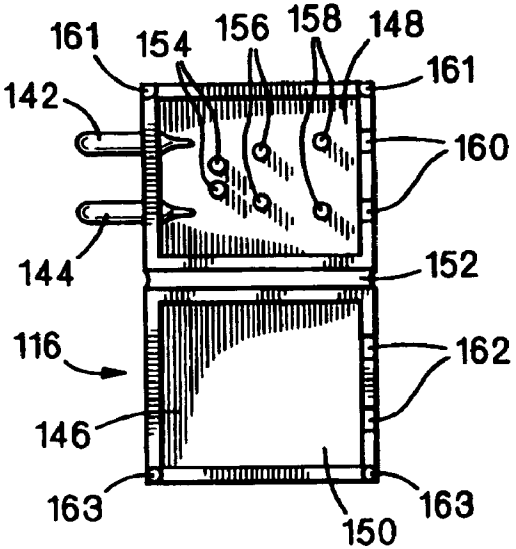
FIG. 7 is a top view of an electrode connector in an open configuration.
Figure 11:
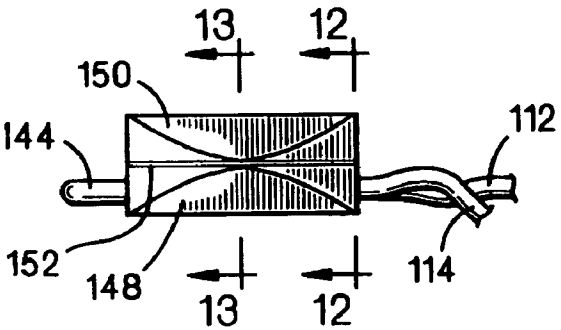
FIG. 11 is a front view of the electrode connector of FIG. 7 in a closed configuration.

Referring to FIGS. 7–13, connector 116, shown in an open configuration in FIGS. 7–9, includes a body 146 that is a single piece of molded plastic. Body 146 includes a base 148 in which terminals 142, 144 are positioned and a cover 150. Base 148 and cover 150 are connected by an integral hinge 152. Base 148 includes three pairs of strain relief posts 154, 156, 158, a pair of semicircular wire lead cutouts 160, and a pair of male locking tabs 161. Cover 150 includes a pair of semicircular wire lead cutouts 162, and a pair of female locking tabs 163.

Figure 10:
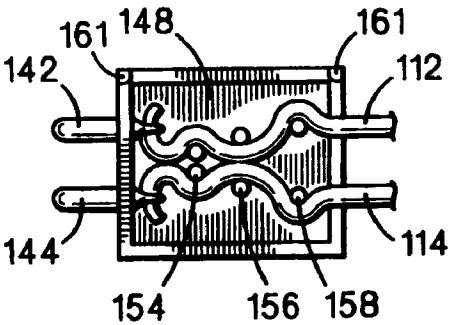
FIG. 10 is a top view of a portion of the electrode connector of FIG. 7, with wires inserted.

At assembly, as shown in FIG. 10, wire leads 112, 114 are connected, respectively, to terminals 142, 144. Wire leads 112, 114 are then threaded around posts 154, between posts 156, and around posts 158 before passing through cutouts 160.

Once wire leads 112, 114 are in place, body 146 is folded along hinge 152 so that cover 150 is positioned on base 148 so that locking tabs 161 engage locking tabs 163. Cover 150 is then sealed to base 148.

Other embodiments are within the following claims. For example, connector 116 could replace gasket 88 in dual-compartment electrode package 50. Similarly, gasket 88 could replace connector 116 in electrode package 100. In addition, rather than mounting electrodes on the interior surfaces of dual-compartment electrode package 50 and electrode package 100, the electrodes could be loosely placed within the packages.

What is claimed is:

1. An electrode package in which one or more adhesively-applied skin electrodes may be sealed, said electrode package comprising:

a first adhesively-applied skin electrode, an envelope comprising a sheet of material and adapted to open to a generally flat configuration, and a releasable seal joining portions of said envelope to provide a sealed first compartment, said first electrode being positioned in said sealed first compartment and isolated from an external environment, said package further comprising a first wall that defines a first interior surface facing the interior of said sealed first compartment, said first interior surface including a first electrode mounting surface attached to an adhesive portion of said first electrode, wherein said envelope may be opened to expose said first electrode to the external environment by releasing said releasable seal.

2. The electrode package of claim 1, further comprising a second adhesively-applied skin electrode positioned in said sealed first compartment and isolated from the external environment, and a second wall that defines a second interior surface facing the interior of said sealed first compartment, said second interior surface including a second electrode mounting surface attached to an adhesive portion of said second electrode, wherein said second electrode may be exposed to the external environment by releasing said releasable seal.

3. The electrode package of claim 2, wherein a first edge of said envelope comprises a fold in said sheet of material, each of said first and second interior surfaces are located on opposite sides of said fold, and said first edge, said first interior surface, said second interior surface, and said releasable seal are adapted to permit said envelope to be opened by breaking said releasable seal and folding back said envelope at said first edge.

4. The electrode package of claim 3, wherein said envelope further comprises a pair of tabs adapted to aid in breaking said releasable seal, said tabs being located opposite said first edge of said envelope.

5. The electrode package of claim 1, further comprising an adhesive layer for temporarily securing a wire lead of said first electrode to said first interior surface, said adhesive layer being located on said first interior surface.

6. The electrode package of claim 1, wherein said envelope further comprises:

a second compartment for containing a connector of said first electrode, and a barrier element between said first and second compartments, said barrier element providing an electrically conductive path between said first electrode and the connector of said first electrode.

7. The electrode package of claim 6, wherein said envelope is adapted to permit said second compartment to be opened without affecting said releasable seal.

8. The electrode package of claim 6, wherein said barrier element comprises a layer of material formed around a wire lead of said first electrode, the wire lead providing the electrically conductive path between said first electrode and the connector of said first electrode.

9. The electrode package of claim 6, wherein said barrier element comprises a body of the connector of said first electrode, the body providing the electrically conductive path between said first electrode and the connector of said first electrode.

10. The electrode package of claim 1, further comprising a first reinforcing layer located at said first electrode mounting surface, wherein said first wall is thicker at said first electrode mounting surface than at other regions of said first interior surface.

11. An electrode package in which one or more adhesively-applied skin electrodes may be sealed, said electrode package comprising:

a first adhesively-applied skin electrode, a second adhesively-applied skin electrode, an envelope comprising a sheet of material, a releasable seal joining portions of said envelope to provide a sealed first compartment, said first electrode and said second electrode being positioned in said sealed first compartment and isolated from an external environment, a first wall that defines a first interior surface facing the interior of said sealed first compartment, said first interior surface including a first electrode mounting surface attached to an adhesive portion of said first electrode, a second wall that defines a second interior surface facing the interior of said sealed first compartment, said second interior surface including a second electrode mounting surface attached to an adhesive portion of said second electrode, wherein said first and second interior surfaces face each other.

12. The electrode package of claim 11, wherein said first electrode and said second electrode may be exposed to the external environment by releasing said releasable seal, and wherein, when said releasable seal is released, said first and second electrode mounting surfaces both face upward and are approximately coplanar.

[13. An electrode package in which one or more adhesively-applied skin electrodes may be sealed, said electrode package comprising:

a first adhesively-applied skin electrode, a first compartment containing said first electrode, a releasable seal adapted to seal said first compartment and maintain said first electrode in a sealed mode in which said first electrode is not exposed to an external environment, a connector of said first electrode, a second compartment outside of said first compartment and containing said connector of said first electrode, and a barrier element positioned at said releasable seal and providing an electrically conductive path between the first electrode and the connector without exposing the first electrode to the external environment.]

14. [The electrode package of claim 13,] *An electrode package in which one or more adhesively-applied skin electrodes may be sealed, said electrode package comprising:*

*a first adhesively-applied skin electrode,*

*a first compartment containing said first electrode,*

*a releasable seal adapted to seal said first compartment and maintain said first electrode in a sealed mode in which said first electrode is not exposed to an external environment,*

*a connector of said first electrode,*

*a second compartment outside of said first compartment and containing said connector of said first electrode, and*

*a barrier element positioned at said releasable seal and providing an electrically conductive path between the first electrode and the connector without exposing the first electrode to the external environment,* wherein said barrier element comprises a layer of material formed around a wire lead of said first electrode, the wire lead providing the electrically conductive path between said first electrode and the connector.

[15. The electrode package of claim 13, wherein said barrier element comprises a body of the connector, the body providing the electrically conductive path between said first electrode and the connector.]

[16. An electrode package in which one or more adhesively-applied skin electrodes may be sealed, said electrode package comprising:

a first adhesively-applied skin electrode, a compartment containing said first electrode, a releasable seal adapted to seal said compartment and maintain said first electrode in a sealed mode in which said first electrode is not exposed to an external environment, a connector of said first electrode, the connector being exposed to the external environment, and a barrier element positioned at releasable seal and providing an electrically conductive path between said first electrode and said connector of said first electrode without exposing the first electrode to the external environment.]

[17. The electrode package of claim 16, wherein said barrier element comprises a layer of material formed around a wire lead of said first electrode, the wire lead providing the electrically conductive path between said first electrode and the connector.]

18. [The electrode package of claim 17,] *An electrode package in which one or more adhesively-applied skin electrodes may be sealed, said electrode package comprising:*

*a first adhesively-applied skin electrode,*

*a compartment containing said first electrode,*

*a releasable seal adapted to seal said compartment and maintain said first electrode in a sealed mode in which said first electrode is not exposed to an external environment,*

*a connector of said first electrode, the connector comprising at least one terminal adapted to make and break an electrical connection, and the connector being exposed to the external environment, and*

*a barrier element positioned at said releasable seal and providing an electrically conductive path between said first electrode and said connector of said first electrode without exposing the first electrode to the external environment,*

*wherein said barrier element comprises a layer of material formed around a wire lead of said first electrode, the wire lead providing the electrically conductive path between said first electrode and the connector,* wherein the layer of material includes an arcuate upper portion and an arcuate lower portion, said barrier element being formed by heat sealing a first wall of the compartment to the arcuate upper portion, heat sealing a second wall of the compartment to the arcuate lower portion, and heat sealing the first and second walls to each other.

[19. The electrode package of claim 16, wherein said barrier element comprises a body of the connector, the body providing the electrically conductive path between said first electrode and the connector.]

20. An electrode package in which one or more adhesively-applied skin electrodes may be sealed, said electrode package comprising:

a compartment [for maintaining a] *sized and configured to enclose a first said electrode and to maintain the* first said electrode in either a sealed mode in which the first said electrode is not exposed to an external environment or an unsealed mode in which the first said electrode is exposed to the external environment, and a barrier element between said compartment and the external environment, said barrier element providing an electrically conductive path between the first said electrode and a connector of the first said electrode that is located in the external environment, wherein said barrier element comprises a body of the connector, the body providing the electrically conductive path between the first said electrode and the connector, and wherein the body comprises a single piece of material and includes an integral hinge.

21. An electrode package in which one or more adhesively-applied skin electrodes may be sealed, said electrode package comprising:

a compartment [for maintaining a] *sized and configured to enclose a first said electrode and to maintain the* first said electrode in either a sealed mode in which the first said electrode is not exposed to an external environment or an unsealed mode in which the first said electrode is exposed to the external environment, and a barrier element between said compartment and the external environment, said barrier element providing an electrically conductive path between the first said electrode and a connector of the first said electrode that is located in the external environment, wherein said barrier element comprises a body of the connector, the body providing the electrically conductive path between the first said electrode and the connector, and wherein the body includes a plurality of strain relief posts for relieving strain on a wire lead located between the first said electrode and the connector.

22. An electrode package in which one or more adhesively-applied skin electrodes may be sealed, said electrode package comprising:

a compartment [for maintaining a] *sized and configured to enclose a first said electrode and to maintain the* first said electrode in either a sealed mode in which the first said electrode is not exposed to an external environment or an unsealed mode in which the first said electrode is exposed to the external environment, and a barrier element between said compartment and the external environment, said barrier element providing an electrically conductive path between the first said electrode and a connector of the first said electrode that is located in the external environment, wherein said barrier element comprises a body of the connector, the body providing the electrically conductive path between the first said electrode and the connector, and wherein the body includes a first end located in the external environment, a second end located in said compartment, and a central section that comprises said barrier element and includes an arcuate upper portion and an arcuate lower portion, said barrier element being formed by heat sealing a first wall of the compartment to the arcuate upper portion, heat sealing a second wall of the compartment to the arcuate lower portion, and beat sealing the first and second walls to each other.

*23. An electrode package in which one or more adhesively-applied skin electrodes may be sealed, the electrode package comprising:*

*an adhesively-applied skin electrode,*

*a wire lead extending from the electrode,*

*a compartment containing the electrode and wire lead and maintaining the electrode and wire lead in isolation from an external environment, and*

*a connector electrically connected to the electrode, the connector comprising at least one terminal and a connector body supporting the terminal,*

*the connector body comprising*

*a first end exposed to an interior of the compartment and in isolation from the external environment and*

*a second end isolated from the interior of the compartment when the compartment maintains the electrode in isolation from the external environment,*

*the terminal being nonunitary with the wire lead, and comprising*

*a first terminal end connected to the wire lead and*

*a second terminal end located at the second end of the connector body,*

*the connector providing an electrically conductive path to the electrode from the second terminal end outside the compartment when the compartment maintains the electrode in isolation from the external environment.*

*24. The electrode package of claim 23, further comprising a second adhesively-applied skin electrode positioned within the compartment, the compartment sized and configured to maintain the second electrode in isolation from the external environment, wherein:*

*the second electrode is removable from the compartment to expose the second electrode to the external environment.*

*25. The electrode package of claim 23, wherein the connector further comprises a second terminal with an end extending from the second end of the connector body, wherein an electrically conductive path is provided between the second electrode and the end of the second terminal when the compartment maintains the electrodes in isolation from the external environment.*

*26. The electrode package of claim 23, wherein the compartment comprises an envelope comprising a sheet of material that defines the compartment and is adapted to open to a generally flat configuration.*

*27. The electrode package of claim 26, wherein the envelope further comprises a seal joining portions of the envelope to define the compartment.*

*28. The electrode package of claim 27, wherein the seal comprises a releasable seal, the envelope being openable to expose the first electrode to the external environment by releasing the releasable seal.*

*29. The electrode package of claim 26, wherein the compartment comprises a first wall that defines a first interior surface facing the interior of the compartment, the first interior surface including a first electrode mounting surface attached to an adhesive portion of the electrode.*

*30. The electrode package of claim 29, further comprising:*

*a second adhesively-applied skin electrode positioned in the compartment and isolated from the external environment, and*

*a second wall that defines a second interior surface facing the interior of the compartment, the second interior surface including a second electrode mounting surface attached to an adhesive portion of the second electrode.*

*31. The electrode package of claim 30, wherein*

*each of the first and second interior surfaces are located on opposite sides of a first edge of the envelope, and*

*the first edge, the first interior surface, and the second interior surface are adapted to permit the envelope to be opened by folding back the envelope at the first edge.*

*32. The electrode package of claim 31, wherein the first edge of the envelope comprises a fold in the sheet of material.*

*33. The electrode package of claim 31, wherein the envelope further comprises a pair of tabs adapted to aid opening the envelope, the tabs being located opposite the first edge of the envelope.*

*34. The electrode package of claim 30, wherein the first and second interior surfaces face each other.*

*35. The electrode package of claim 34, wherein the first electrode and the second electrode may be exposed to the external environment by opening the envelope, and wherein, when the envelope is opened, the first and second electrode mounting surfaces both face upward and are approximately coplanar.*

*36. The electrode package of claim 29, further comprising an adhesive layer for temporarily securing a wire lead of the electrode to the first interior surface, the adhesive layer being located on the first interior surface.*

*37. The electrode package of claim 29, further comprising a first reinforcing layer located at the first electrode mount-*

*ing surface, wherein the first wall is thicker at the first electrode mounting surface than at other regions of the first interior surface.*

*38. The electrode package of claim 23, wherein the connector body comprises a single piece of material and includes an integral hinge.*

*39. The electrode package of claim 23 wherein the connector body includes strain relief elements for relieving strain on the wire lead.*

*40. The electrode package of claim 23, wherein the connector body includes a central section between the first and second ends, the central section including an arcuate upper portion and an arcuate lower portion,*

*wherein the electrode is isolated from the external environment and the connector is secured by sealing a first wall of the compartment to the arcuate upper portion of the central section, sealing a second wall of the compartment to the arcuate lower portion of the central section, and*

*sealing the first and second walls to each other.*

*41. The electrode package of claim 40, wherein a releasable seal is formed along the sealed connection of the first and second walls.*

*42. The electrode package of claim 23, wherein:*

*the compartment includes a seal between a first wall of the compartment and a second wall of the compartment;*

*the connector body includes a central section between the first and second ends; and*

*the central section extends through the seal, with the first end of the connector body being located on a first side of the seal and a second end of the connector body being located on a second side of the seal.*

*43. The electrode package of claim 42, wherein:*

*the central section of the connector body includes an upper portion and a lower portion;*

*the first wall of the compartment is secured to the upper portion of the connector body; and*

*the second wall of the compartment is secured to the lower portion of the connector body.*

*44. The electrode package of claim 43, wherein:*

*the first wall of the compartment is secured to the upper portion of the connector body by heat sealing; and*

*the second wall of the compartment is secured to the lower portion of the connector body by heat sealing.*

*45. The electrode package of claim 23 in combination with a defibrillator, wherein the adhesively-applied skin electrode comprises a defibrillation electrode and the connector and defibrillator are connected to provide an electrically conductive path between the defibrillator and the electrode while the compartment maintains the electrode in isolation from the external environment.*

*46. The electrode package of claim 6 in combination with a defibrillator, wherein the first adhesively-applied skin electrode comprises a defibrillation electrode and the connector and defibrillator are connected to provide an electrically conductive path between the defibrillator and the electrode while the sealed first compartment maintains the electrode in isolation from the external environment.*

*47. The electrode package of claim 14 in combination with a defibrillator, wherein the first adhesively-applied skin electrode comprises a defibrillation electrode and the connector and defibrillator are connected to provide an electrically conductive path between the defibrillator and the electrode while the releasable seal maintains the electrode in the sealed mode in isolation from the external environment.*

*48. The electrode package of claim 18 in combination with a defibrillator, wherein the first adhesively-applied skin electrode comprises a defibrillation electrode and the connector and defibrillator are connected to provide an electrically conductive path between the defibrillator and the electrode while the releasable seal maintains the electrode in the sealed mode in isolation from the external environment.*

* * * * *